US011816039B2

(12) United States Patent
Pearson et al.

(10) Patent No.: US 11,816,039 B2
(45) Date of Patent: Nov. 14, 2023

(54) MULTI-MODE PROTECTED MEMORY

(71) Applicant: Intel Corporation, Santa Clara, CA (US)

(72) Inventors: Adrian Pearson, Hillsboro, OR (US); Bing Zhu, Shanghai (CN); Elena Agranovsky, Jerusalem (IL); Tomas Winkler, Mevasert Zion (IL); Yang Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/441,214

(22) PCT Filed: Apr. 19, 2019

(86) PCT No.: PCT/CN2019/083388
§ 371 (c)(1),
(2) Date: Sep. 20, 2021

(87) PCT Pub. No.: WO2020/211070
PCT Pub. Date: Oct. 22, 2020

(65) Prior Publication Data
US 2022/0164293 A1 May 26, 2022

(51) Int. Cl.
*G06F 12/14* (2006.01)
(52) U.S. Cl.
CPC ...... *G06F 12/1408* (2013.01); *G06F 12/1425* (2013.01); *G06F 12/1466* (2013.01)

(58) Field of Classification Search
CPC ............ G06F 12/1408; G06F 12/1425; G06F 12/1466; G06F 21/64; G06F 21/79
See application file for complete search history.

(56) References Cited

U.S. PATENT DOCUMENTS

| 7,827,370 | B2 * | 11/2010 | Ahvenainen | ........ G06F 12/1433 |
| | | | | 711/E12.099 |
| 2008/0170436 | A1 * | 7/2008 | Chun | ..................... G11C 16/22 |
| | | | | 365/185.11 |

(Continued)

FOREIGN PATENT DOCUMENTS

| CN | 101006407 A | 7/2007 |
| CN | 104516834 A | 4/2015 |

(Continued)

OTHER PUBLICATIONS

International Search Report and Written Opinion for PCT Patent Application No. PCT/CN2019/083388, dated Jan. 14, 2020, 9 pages.

(Continued)

*Primary Examiner* — Aracelis Ruiz
(74) *Attorney, Agent, or Firm* — Compass IP Law PC

(57) ABSTRACT

Multi-mode protected memory in accordance with the present description includes a permanent mode and a transient mode of operation. In one embodiment of the permanent mode, an authentication key is programmable once and a write counter is not decrementable or resettable. In one embodiment of the transient mode, an authentication key may be programmed many times and a write counter may be reset many times. Other features and advantages may be realized, depending upon the particular application.

15 Claims, 6 Drawing Sheets

(56) References Cited

U.S. PATENT DOCUMENTS

| | | | |
|---|---|---|---|
| 2010/0106891 A1* | 4/2010 | Mietus | G11C 16/225 |
| | | | 711/E12.008 |
| 2013/0014269 A1 | 1/2013 | Chang et al. | |
| 2014/0095878 A1* | 4/2014 | Shimano | H04L 9/0825 |
| | | | 713/171 |
| 2014/0108823 A1* | 4/2014 | Rudelic | G06F 12/1408 |
| | | | 713/193 |
| 2015/0161399 A1* | 6/2015 | Mylly | G06F 21/79 |
| | | | 726/30 |
| 2015/0286585 A1* | 10/2015 | Caraccio | G06F 12/1458 |
| | | | 713/189 |

FOREIGN PATENT DOCUMENTS

| | | |
|---|---|---|
| JP | 2010225259 A | 10/2010 |
| WO | 2012153144 A2 | 11/2012 |

OTHER PUBLICATIONS

JEDEC Standard, "Universal Flash Storage (UFS)", Version 2.1, JESD220C, Mar. 2016, 382 pages.

NVM Express®, "Base Specification", Revision 1.3d, Mar. 20, 2019, 298 pages.

\* cited by examiner

MULTI-MODE PROTECTED MEMORY

CLAIM OF PRIORITY

This application is a U.S. National Phase application under 35 U.S.C. § 371 of International Application No PCT/CN2019/083388, filed, Apr. 19, 2019, entitled "MULTI-MODE PROTECTED MEMORY", the entire contents of which are incorporated herein by reference.

BACKGROUND

A memory or storage device such as a Nonvolatile Memory express (NVMe) Solid State Drive (SSD) as described in the NVMe standard, https://nvmexpress.org/, may have a protected block or other portion of memory which allows access to the protected portion to be authenticated. For example, a storage device employing a known Replay Protected Memory Block (RPMB) as described in the RPMB portion of the published NVMe standard, authenticates read and write access to the protected RPMB data area of the storage device using a Message Authentication Code (MAC). The published RPMB specification describes protected memory device structures and operations compliant with the RPMB standard.

In one known design, a host stores an authentication key in an RPMB controller of the RPMB enabled storage device (here, an "RPMB storage device." Thus, the authentication key is a secret shared by the host and the RPMB storage device. A host requests a data write operation directed to the protected data area of the memory using a data write message. The host has a Message Authentication Code (MAC) engine which calculates a MAC authentication code as a function of the shared authentication key, a write counter value previously received from the RPMB storage device, and a portion of the data write request message which includes the MAC authentication code when sent. Hence, the write operation requested by the data write request message is referred to as an "authenticated data write."

BRIEF DESCRIPTION OF THE DRAWINGS

Referring now to the drawings in which like reference numbers represent corresponding parts throughout.

DETAILED DESCRIPTION

Figure 1:
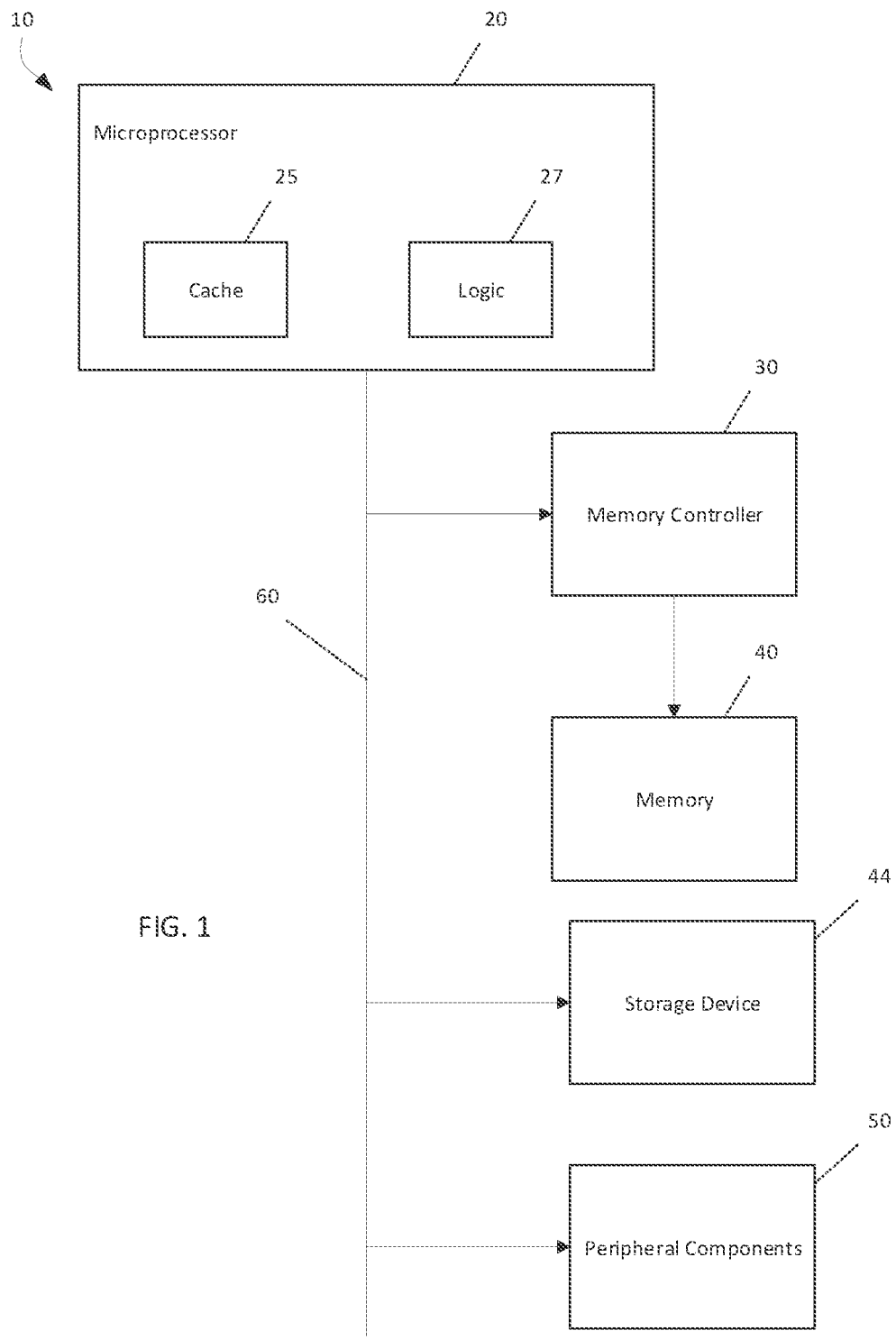
FIG. 1 illustrates a block diagram of a computing environment employing multi-mode protected memory in accordance with certain embodiments.

In the following description, reference is made to the accompanying drawings which form a part hereof and which illustrate several embodiments. It is understood that other embodiments may be utilized, and structural and operational changes may be made.

In a known design, the RPMB controller of an RPMB storage device receiving a data write request message authenticates the received message by calculating its own MAC authentication code using the shared authentication key in a manner similar to the host, and comparing it to the MAC authentication code forwarded by the host with the data write request. If the MAC authentication code calculated by the RPMB controller matches the MAC authentication code forwarded by the host with the request message, the received data write request message passes an authentication process of the RPMB storage device, and the message is deemed authentic, that is, sent by an authorized sender. A data write operation requested by the data write request message may be subjected to additional security tests as described in the RPMB standard. If the data write request message fails the authentication or other security tests, the requested write operation to the protected memory is blocked.

A read response message generated by an RPMB controller in response to a read request message generated by a host and directed to a protected memory, may be authenticated by the RPMB controller and the host in a manner similar to that of a data write request message. If the data read response message received by the host fails the authentication or other security tests, the read response message and its data may be considered to be from an unauthenticated source and therefore not trustworthy.

As a security feature in known RPMB designs against malicious attacks, the authentication key is stored by the RPMB controller in a write-once register. As a result, once the authentication key is stored by the RPMB controller, it is permanently fixed and thus cannot be changed, that is, overwritten, erased or even read in known RPMB controller designs.

As another security feature against malicious attacks in known RPMB designs, the write counter maintained by the RPMB controller cannot be decremented or reset. As a result, a malicious attack that may include recording a write data request message and replaying the recorded message is blocked from execution because the recorded message being replayed will not contain the write counter value expected by the RPMB controller, that is, the current write counter value.

Thus, known RPMB storage devices provide tamper-resistant secure storage for security applications. However, the security features of an RPMB storage device can cause inefficiencies for third-party developers in developing products incorporating a known RPMB storage device. For example, if the authentication key programmed into an RPMB device being used for product development purposes is lost due to a programming error or other software error, access to the RPMB data area is permanently lost, and the RPMB device is typically discarded and replaced to continue the product development. Moreover, for some third-party developers, the RPMB key used during the development stage is frequently different from the RPMB key which will be used at the production stage for security reasons.

As a result, if an RPMB storage device is used by third-party developers in the development stage, that particular device cannot be subsequently used in the production stage because the RPMB authentication key has already been programmed with a non-production authentication key and cannot be changed. As another example, if the write counter reaches the maximum write count value over the course of product testing such as in stress or regression testing, no further writes to the protected data area will be permitted, and again, the RPMB device is typically discarded and replaced to continue the product development.

To facilitate developing products incorporating a finished RPMB storage device, it is known for third-party developers to emulate a finished RPMB device in a software emulation in which the data area of the RPMB emulation is an ordinary portion of memory or storage which lacks the protections normally afforded the data area of known RPMB storage devices available on the market. However, these software emulations of an RPMB device tend to be complex to develop and complex in operation. For example, the system software, firmware and hardware of a product in development may each have multiple components which each need to access one or more RPMB targets. Thus, development and debugging of RPMB emulation software for each component of the system software and hardware can be difficult and expensive. In addition, data such as special keys or certificates stored in the ordinary portion of the memory may need to be copied to the protected data area and then deleted from the ordinary portion once the authentication key is programmed into the RPMB device following completion of development.

It is known for original equipment manufacturers (OEMs) of RPMB storage devices to employ a default authentication key to facilitate development and testing of RPMB firmware implementations in an engineering sample of an RPMB storage device. However, the default authentication key is disabled in the finished product versions of the RPMB device before being shipped to customers such as third-party product developers. Hence, third-party product developers cannot use the manufacturer's disabled default authentication key in the development of their own third-party products utilizing a finished RPMB storage device, and as a result, frequently employ software emulations of an RPMB storage device.

Multi-mode protected memory in accordance with the present description provides a significant improvement in computer technology. For example, the need for third party developers to use software emulations of RPMB enabled devices in the development of products incorporation RPMB enabled devices, can be reduced or eliminated. In one aspect, a multi-mode protected memory in accordance with the present description has both a transient mode of operations and a permanent mode of operations. In the permanent mode, the RPMB-enabled device operates in a manner similar to known RPMB devices. For example, an authentication key may be programmed only once in the permanent mode in a manner similar to known RPMB devices.

By comparison, in one aspect of the transient mode of a multi-mode protected memory in accordance with the present description, an authentication key may be, in one embodiment, re-programmed an unlimited number of times while the device remains in the transient mode, to facilitate development of third party products. Thus, if an authentication key is inadvertently lost during development of the third party product, the same or a new authentication key may be readily re-programmed into the RPMB-enabled device while it remains in the transient mode. As a result, the need to discard the RPMB device due to a lost authentication key is avoided.

As another example, in the permanent mode, a write counter for write operations to a protected memory user data area may not be decremented or reset once it reaches a maximum count value, in a manner similar to known RPMB devices. Thus, once the write counter reaches the maximum value in the permanent mode, additional write operations to the protected memory are no longer permitted.

By comparison, in one aspect of the transient mode of a multi-mode protected memory in accordance with the present description, a write counter may be reset, in one embodiment, an unlimited number of times while the device is operated in the transient mode. Thus, if the write counter of the RPMB-enabled device during development of a third party product reaches a maximum count value as a result of stress tests or other tests involving a large number of write operations, the write counter may be readily reset while the device remains in the transient mode, to allow additional write operations to the protected memory in the transient mode. As a result, a multi-mode protected memory device in accordance with the present description need not be discarded once the write counter reaches a maximum value in the transient mode.

In another aspect of a multi-mode protected memory in accordance with the present description, a set of operations such as an authenticated key operation, a write counter read request, an authenticated data write, and an authenticated data read operation, may be provided in the permanent mode which are the same or substantially the same as those of known RPMB devices as described in the RPMB standard, to facilitate backward compatibility with known RPMB devices. The permanent mode set of operations may be modified as appropriate for permanent mode operation. For example, in one embodiment of a multi-mode protected memory in accordance with the present description, programming of an authentication key using the authentication key programming operation of the permanent set of operations, causes the multi-mode device to permanently enter the permanent mode of operations and to disable re-entry back to the transient mode of operations.

In yet another aspect of a multi-mode protected memory in accordance with the present description, another set of operations such as an authenticated key operation, a write counter read request, an authenticated data write and an authenticated data read operation, may be provided in the transient mode which are substantially similar to those of the permanent mode herein or those of known RPMB devices as described in the RPMB standard, to facilitate development of third party devices for use with RPMB devices. The transient mode set of operations may be modified as appropriate for transient mode operation. For example, in one embodiment of a multi-mode protected memory in accordance with the present description, the transient mode set of operations may be distinguishable from those of the permanent mode set of operations by utilizing, for example, a different set of command codes.

In addition, programming of an authentication key using the authentication key programming operation of the transient set of operations may be repeatedly performed in the transient mode as described above. Still further, resetting of the write counter of the transient mode may be repeatedly performed in the transient mode as described above. Other features and advantages may be realized, depending upon the particular application.

Components employing multi-mode protected memory in accordance with the present description can be used either in stand-alone components, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Implementations of the described techniques may include hardware, a method or process, or computer software such an application, operating system, BIOS, or component driver on a computer-accessible medium. Thus, embodiments include corresponding computer systems, apparatus, and computer programs recorded on one or more computer storage devices, each configured to perform the actions of the methods.

Operations described herein are performed by logic which is configured to perform the operations either automatically or substantially automatically with little or no system operator intervention, except where indicated as being performed manually such as user selection. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom Very Large Scale Integrated (VLSI) circuits or gate arrays, off-the-shelf semiconductors such as logic chips, transistors, or other discrete components. A logic element may also be implemented in firmware or programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several non-volatile memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Turning to the figures, FIG. 1 is a high-level block diagram illustrating selected aspects of a system implemented according to an embodiment of the present disclosure. System 10 may represent any of a number of electronic and/or computing devices, that may include a protected memory enabled storage device such as a memory device. Such electronic and/or computing devices may include computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, I/O controller, root complex, memory, etc.). In alternative embodiments, system 10 may include more elements, fewer elements, and/or different elements. Moreover, although system 10 may be depicted as comprising separate elements, it will be appreciated that such elements may be integrated on to one platform, such as systems on a chip (SoCs). In the illustrative example, system 10 comprises a central processing unit or microprocessor 20, a memory controller 30, a memory 40, a storage drive 44 and peripheral components 50 which may include, for example, end-point devices such as a video controller, additional storage, network interface, and other devices such as system clock, input device, output device, battery, etc. The system 10 also includes one or more busses 60 which may include serial busses, parallel busses, and a fabric which may include links and switches.

The microprocessor 20 includes a cache 25 that may be part of a memory hierarchy to store instructions and data, and the system memory may include both volatile memory as well as the memory 40 depicted which may include a non-volatile memory. The system memory may also be part of the memory hierarchy. Logic 27 of the microprocessor 20 may include a one or more cores, for example. In some embodiments, the logic 27 may also include a system clock. Communication between the microprocessor 20 and the memory 40 may be facilitated by the memory controller (or chipset) 30, which may also facilitate in communicating with the storage drive 44 and the peripheral components 50. The system may include an offload data transfer engine for direct memory data transfers.

Storage drive 44 may be a protected memory enabled device and includes non-volatile storage and may be implemented as, for example, solid-state drives, magnetic disk drives, optical disk drives, storage area network (SAN), network access server (NAS), a tape drive, flash memory, persistent memory domains and other storage devices employing a volatile buffer memory and a nonvolatile storage memory. The storage may comprise an internal storage device or an attached or network accessible storage. The microprocessor 20 is configured to write data in and read data from the memory 40 and storage 44. Programs in the storage are loaded into the memory 40 and executed by the microprocessor 20. A network controller or adapter enables communication with a network, such as an Ethernet, a Fiber Channel Arbitrated Loop, etc. Further, the architecture may, in certain embodiments, include a video controller configured to render information on a display monitor, where the video controller may be embodied on a video card or integrated on integrated circuit components mounted on a motherboard or other substrate. In one embodiment, the display is configured to display information as a function of memory operations directed to a protected memory. An input device is used to provide user input to the microprocessor 20, and may include a keyboard, mouse, pen-stylus, microphone, touch sensitive display screen, input pins, sockets, or any other activation or input mechanism known in the art. An output device is capable of rendering information transmitted from the microprocessor 20, or other component, such as a display monitor, printer, storage, output pins, sockets, etc. The network adapter may be embodied on a network card, such as a peripheral component interconnect (PCI) card, PCI-express, or some other input/output (I/O) card, or on integrated circuit components mounted on a motherboard or other substrate. In one embodiment, the network adapter is configured to transmit information as a function of memory operations directed to a protected memory.

One or more of the components of the device 10 may be omitted, depending upon the particular application. For example, a network router may lack a video controller, for example. Any one or more of the devices of FIG. 1 including the cache 25, memory 40, storage drive 44, system 10, memory controller 30 and peripheral components 50, may include components implementing multi-mode protected memory in accordance with the present description.

One example of a nonvolatile storage memory of a nonvolatile storage memory component in accordance with the present description is a 3-dimensional (3D) crosspoint memory, and other types of byte-addressable, write-in-place non-volatile memory. In some embodiments, 3D crosspoint memory may comprise a transistor-less stackable cross point architecture in which memory cells sit at the intersection of word lines and bit lines and are individually addressable and in which bit storage is based on a change in bulk resistance.

In one embodiment, the memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 2:
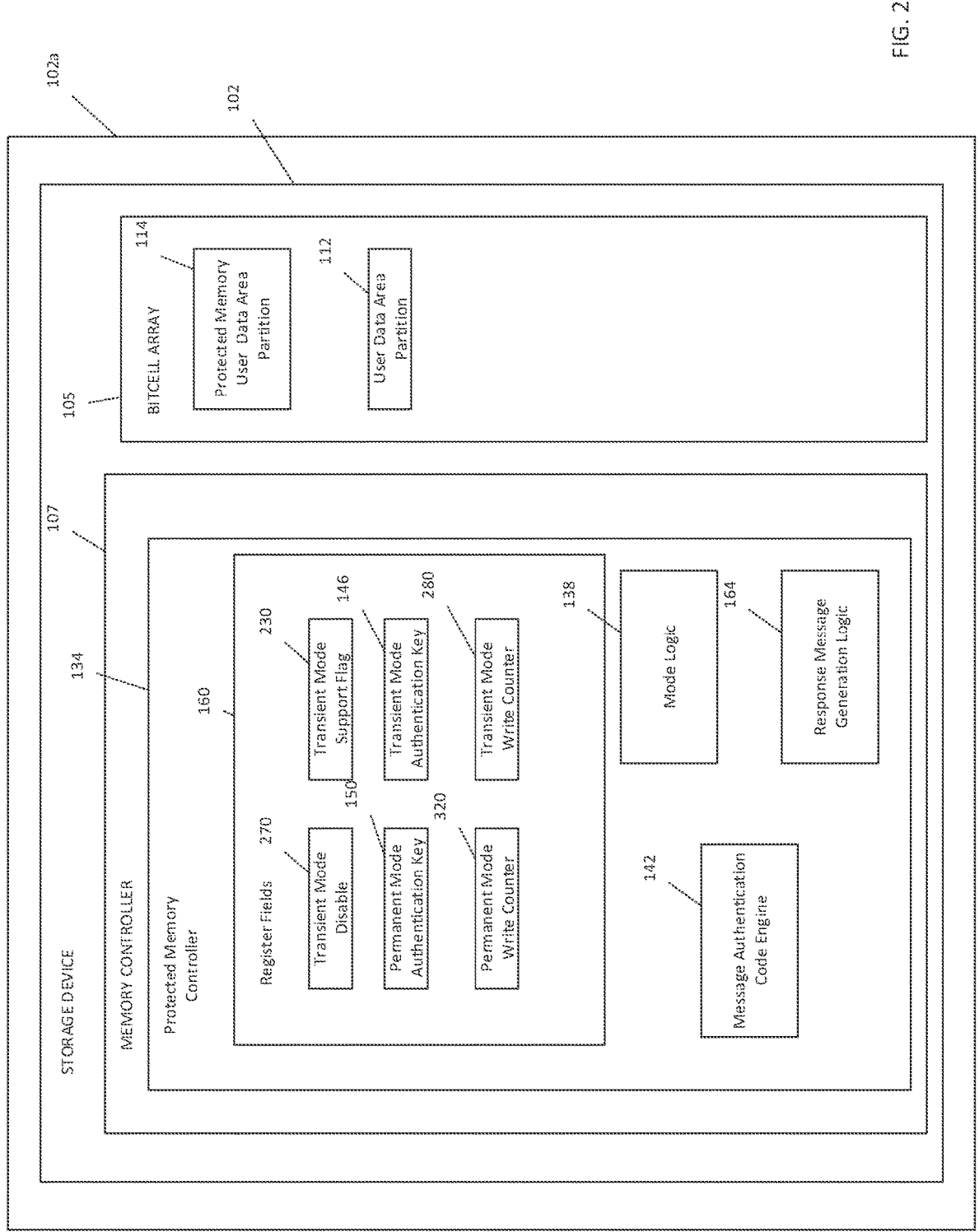
FIG. 2 illustrates an example of a protected memory enabled storage device employing multi-mode protected memory in accordance with the present description.

FIG. 2 shows one example of a protected memory enabled storage device 102 in accordance with the present description. In this example, the protected memory enabled storage device 102 is a nonvolatile storage memory component such as a solid state drive of the storage devices 44 (FIG. 1) of the system 10. It is appreciated that a protected memory enabled storage device employing multi-mode protected memory in accordance with the present description may be employed in other types of devices such as central processing units (CPUs), system on a chip (SoC), graphical processing units (GPUs) and network adapters, for example.

The protected memory enabled storage device 102 has a drive housing 102a which connects the protected memory enabled storage device 102 to a bus 60 (FIG. 1) which may be a PCIe serial bus, for example. The drive housing 102a encloses a memory or storage device 102 having an array 105 of nonvolatile bitcells such as an array of NAND bitcells, configured to store data in a persistent manner, and a memory controller 107 configured to control memory read and memory write operations directed to the bitcell array 105. In one embodiment, the memory controller 107 and bitcell array 105 are packaged within a single package. It is appreciated that in other embodiments, the some or all components of the memory controller 107 and bitcell array 105 may be disposed on different dies or within different packages or devices. For example, some or all components of the memory 107 may be a part of a system on a chip (SoC) whereas some or all components of the bitcell array 105 may be disposed within a protected memory enabled storage device coupled by a bus to the SoC.

In one embodiment, the bitcell array 105 is partitioned into various partitions including a user data area partition 112 and a protected memory user data area partition 114. Each area or partition of the array 105 may include cells of a single level cell (SLC), a triple level cell (TLC), quad level cell (QLC or other multilevel cell (MLC) word line types. In a QLC memory embodiment, the bitcell array 105 may be organized in blocks and planes, for example. It is appreciated that the bitcell array 105 may be organized in units and subunits of other sizes and types, depending upon the particular application.

In accordance with one aspect of multi-mode protected memory in accordance with the present description, the memory controller 107 further includes multi-mode protected memory access controller or logic hereinafter referred to primarily as protected memory controller 134 which is configured to control access to the protected memory user data area partition 114. In one embodiment, such access includes for example, authenticated data write, and authenticated data read operations which are compliant with corresponding Replay Protected Memory Block (RPMB) operations as described in the RPMB standard, and are modified as appropriate in accordance with multi-mode protected memory of the present description. Although the illustrated embodiments of multi-mode protected memory are described in connection with RPMB compliant structures and operations, it is appreciated that multi-mode protected memory in accordance with the present description may be employed in computer systems employing other types of protected memory, depending upon the particular application. The protected memory controller 134 of the device 102 may be configured using one or more of hardware, software, and firmware, alone or in combination.

In one aspect of multi-mode protected memory in accordance with the present description, the protected memory controller 134 includes mode logic 138 configured to operate the protected memory controller 134 and thereby control access to protected memory user data area partition 114 in a selected mode including a transient mode and a permanent mode. Authentication logic such as a Message Authentication Code (MAC) engine 142 of the protected memory controller 134, is configured to authenticate protected memory operations including those directed to the protected memory user data area partition 114, as a function of a re-programmable authentication key in the transient mode, and as a function of a one-time programmable authentication key in the permanent mode. In the illustrated embodiment, the multi-mode protected memory access controller 134 includes a re-programmable register field 146 of register fields 160, which is configured to store the reprogrammable authentication key for the transient mode. Until the transient mode authentication key register field 146 is programmed, the protected memory user data area partition 114 cannot be accessed in the transient mode in this embodiment. Similarly, until a permanent mode authentication key field 150 is programmed and the transient mode is exited, the protected memory user data area partition 114 cannot be accessed in the permanent mode in this embodiment. Thus, in this embodiment, if neither authentication key field 146, 150 has been programmed, the protected memory user data area partition 114 cannot be accessed.

The re-programmable register field 146 for storing the re-programmable authentication key of the transient mode may be a volatile write-only register for example, such that the transient mode key register field 146 may be re-programmed after each power cycle. Alternatively, the re-programmable register for storing the re-programmable authentication key of the transient mode may be a non-volatile write-only register for example, such that the transient mode key would be persistent after each power cycle but may be re-programmed an unlimited number of times in one embodiment.

As noted above, in one embodiment, the re-programmable register for storing the re-programmable authentication key of the transient mode may be a write-only register such that the transient mode authentication key cannot be read by an external host after being programmed. However, it is appreciated that in some embodiments, it may be useful to have the capability to read the transient mode authentication key after being programmed. In such embodiments, a suitable transient mode authentication key request message may be added to the set of transient mode request messages to which the protected memory controller is configured to respond. Such a transient mode authentication key request message may be utilized to read the transient mode authentication key from a suitable read/write register storing the transient mode authentication key in such embodiments.

By comparison to the transient mode authentication key, in one embodiment, a write-once register field 150 of register fields 160, is configured to store the one-time programmable authentication key for the permanent mode. The one-time programmable register field 150 for storing the one-time programmable authentication key of the permanent mode is preferably a non-volatile write-only register field for example, such that the permanent mode key would be persistent after each power cycle but may be programmed only once in one embodiment, in a manner similar to known RPMB devices as a security feature. Thus, a write-once, write-only register field may be used to store the permanent mode authentication key such that the permanent mode authentication key cannot be read or re-programmed after being programmed. However, it is appreciated that in some embodiments, it may be useful to enable an external host to be able to read the permanent mode authentication key after being programmed in embodiments in which fewer security features may be appropriate.

Having the ability to reprogram the transient mode authentication key register field 146 an unlimited number of times in the transient mode, facilitates development of third-party products incorporating protected memory enabled devices and thereby obviates use of complex protected memory simulation software. For example, if the transient mode authentication key being used by the host is lost due to a software error, for example, the transient mode authentication key may be readily reprogrammed to a new transient mode authentication key in the transient mode. In this manner, development of third-party products incorporating protected memory enabled devices is facilitated.

Conversely, limiting programming of the permanent mode authentication key 150 to a one-time programming in the permanent mode following completion of development of the product, maintains a security element provided by an RPMB protected memory in the permanent mode against malicious attacks. As a result, once the authentication code is stored by the protected memory controller in the permanent mode, it is permanently fixed and thus cannot be changed, that is, overwritten, erased or even read in the permanent mode in a manner similar to that of known RPMB controllers.

The protected memory controller 134 is further configured to respond to a transient mode set of protected memory access request messages in the transient mode, and a permanent mode set of protected memory access request messages in the permanent mode. For example, the permanent mode set of protected memory access request messages includes request message types such as authentication key programming request, authenticated data write request and authenticated data read request in one embodiment. Additional request message types may be included in the permanent mode set of protected memory access request messages depending upon the particular application. For example, the RPMB standards provide for additional request message types which may be deemed suitable to include in a permanent mode set of protected memory access request messages, depending upon the particular application.

In one embodiment, the transient mode set of protected memory access request messages may be substantially the same as those of the permanent mode set of protected memory access request messages, differing only by command code values to distinguish request messages of the permanent mode set of protected memory access request messages and request messages of the transient mode set of protected memory access request messages. For example, an authentication key programming request of the permanent mode set may, in one embodiment, have the same command code 0x0001 specified in the RPMB standard for an authentication key programming request message. Conversely, an authentication key programming request of the transient mode set may, in one embodiment, have a different command code such as 0x0081, for example, which is different than that specified in the RPMB standard for an authentication key programming request message. In this manner, a multi-mode protected memory controller may be configured to readily distinguish request messages of the permanent mode set from those of the transient mode set. In one embodiment, the protected memory controller may be configured to return an error response message generated by a response message generation logic 164, in response to receipt of a request message of the transient mode set of request messages when the RPMB enabled device is in the permanent mode instead of the transient mode.

Conversely, the protected memory controller may be configured to return an error response message generated by the response message generation logic 164, in response to receipt of a request message of the permanent mode set of request messages when the RPMB enabled device is in the transient mode instead of the transient mode with at least one exception. For example, if the protected memory controller of the RPMB enabled device receives a permanent mode authentication key programming request message while in the transient mode, the protected memory controller may be configured to proceed to program the permanent mode authentication key and permanently exit the transient mode as described in greater detail below.

Figure 3:
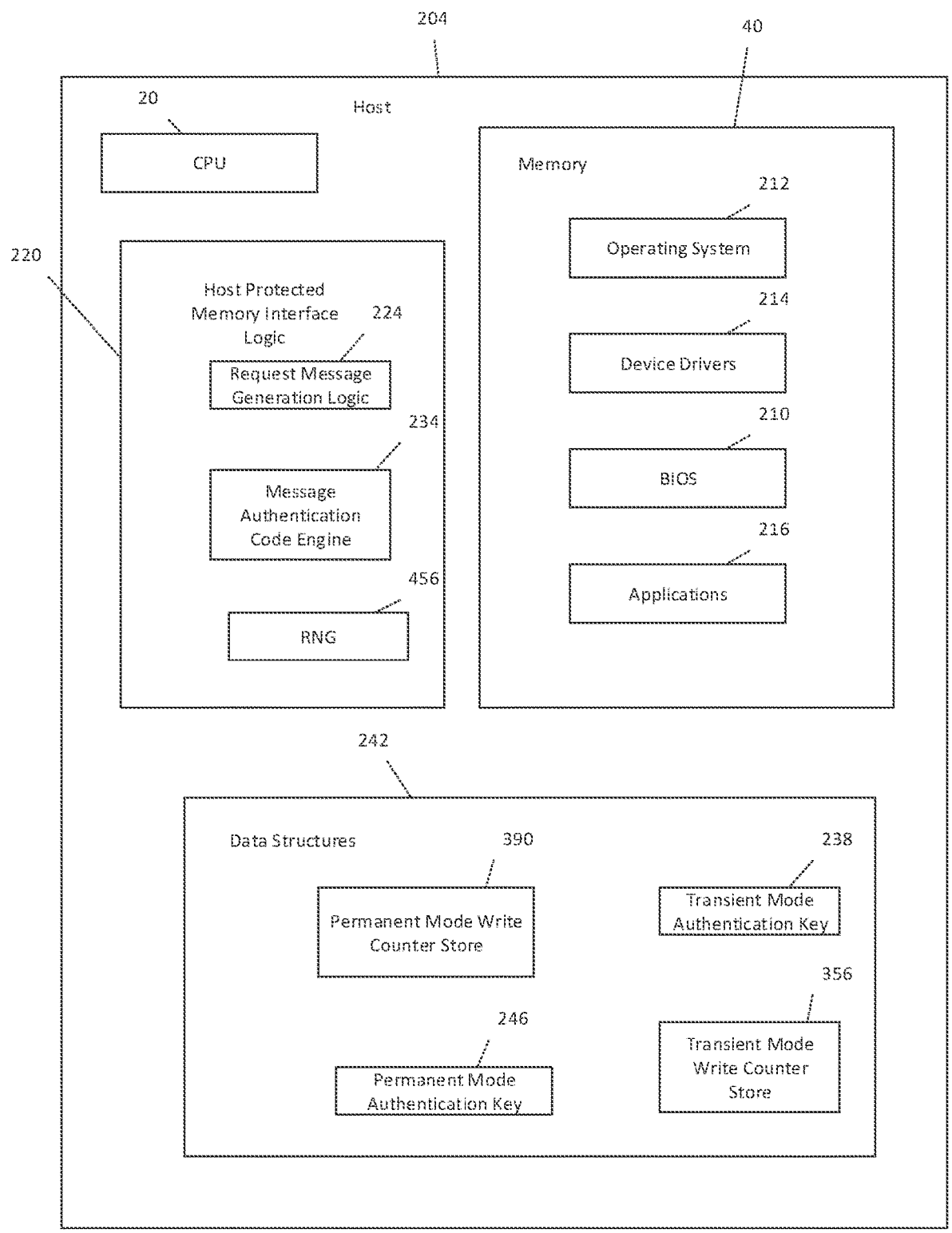
FIG. 3 illustrates an example of a host employing multi-mode protected memory in accordance with the present description.

FIG. 3 depicts one embodiment of a host 204 which includes a processor 20 which may be similar to the microprocessor 20 of FIG. 1. The host further includes a memory 40 (FIG. 1, 3) in which resides a Basic Input/Output System (BIOS) 210, an operating system 212, device drivers 214 and applications 216, which are executed by the processor 20 to perform various logic functions.

A protected memory interface logic 220 of the host 204 has request message generation logic 224 which is configured to generate request messages of the transient mode set of protected memory access request messages for use in the transient mode, and generate request messages of the permanent mode set of protected memory access request messages for use in the permanent mode. The protected memory interface logic 220 of the host 204 may be configured using one or more of hardware, software, and firmware, alone or in combination.

In one embodiment, the protected memory controller 134 (FIG. 2) of the protected memory enabled storage device 102 includes a read-only register field 230 of the register fields 160 to store a transient mode support flag which indicates whether the protected memory controller 134 supports a transient mode of operation. Accordingly, prior to issuing request messages of the transient mode set to a storage device, the host 204 causes the request message generation logic 224 to generate and send to the storage device a support flag register read request. In response, the protected memory controller 134 of the storage device 102 reads the transient mode support flag 230 and causes the response message generation logic 164 to generate a response indicating whether the protected memory controller 134 supports the transient mode as a function of read transient mode support flag 230 read by the controller 134. For example, if the transient mode support flag 230 is set, the protected memory controller 134 can respond in an appropriate response message that the transient mode is supported. Conversely, if the transient mode support flag 230 is not set, the protected memory controller 134 can respond in an appropriate response message that the transient mode is not supported.

A suitable location of the transient mode support flag 230 may depend upon the particular application. For example, in an RPMB enabled storage device compliant with a Universal Flash Storage (UFS) specification, a read-only register field for a transient mode support flag 230 may be added in an UFS Descriptor such as a RPMB Unit Descriptor, for example. As another example, in an RPMB enabled storage device compliant with a Non-Volatile Memory express (NVMe) specification, a read-only register field for a transient mode support flag 230 may be added in an Identify Command/Data Structure (in a field of a Replay Protected Memory Block Support (RPMB S)).

It is noted that in some embodiments, the register field for a transient mode support flag 230 may only be available when protected memory such as RPMB, for example, is supported since RPMB itself is an optional feature in the NVMe Specification, for example. Accordingly, should a host issue a transient mode flag request message to a storage device which lacks Replay Protected Memory Block Support (RPMBS)), for example, a request message to read a transient mode support flag field of the Replay Protected Memory Block Support (RPMBS)) may cause the storage device to generate and send an error message. Accordingly, the host can interpret the error message as indicating that the target storage device lacks a transient mode support flag 230 since it lacks Replay Protected Memory Block Support (RPMBS)).

It is appreciated that different specification standards (e.g. eMMC, UFS, NVMe) may have different register terminologies and layouts. As such the specific location of a register field for the transient mode support flag 230 may vary, depending upon the particular application.

Having determined that the protected memory-enabled storage device 102 supports the transient mode of operation of the protected memory controller 134 (transient mode support flag 230 determined to be set), the host 204 (FIG. 3) may in one aspect of a multi-mode protected memory in accordance with the present description, selectively initiate further protected memory operations directly in the permanent mode, or first in the transient mode and then at an appropriate time, switch the protected memory operations to the permanent mode. For example, if the protected memory-enabled storage device 102 is being used in a development environment, such development would be facilitated by operating the protected memory of the device 102 first in the transient mode. Once development is complete, the protected memory storage device may be permanently switched to the permanent mode for shipment to consumers of the developed product.

Alternatively, the host 204 (FIG. 3) may in one aspect of a multi-mode protected memory in accordance with the present description, initiate further protected memory operations directly in the permanent mode, permanently bypassing operation of the protected memory in the transient mode. For example, if development of a product incorporating a protected memory-enabled storage device 102 has been completed, the protected memory of the storage device may be directly and permanently switched to the permanent mode for shipment to consumers of the developed product.

Figure 4:
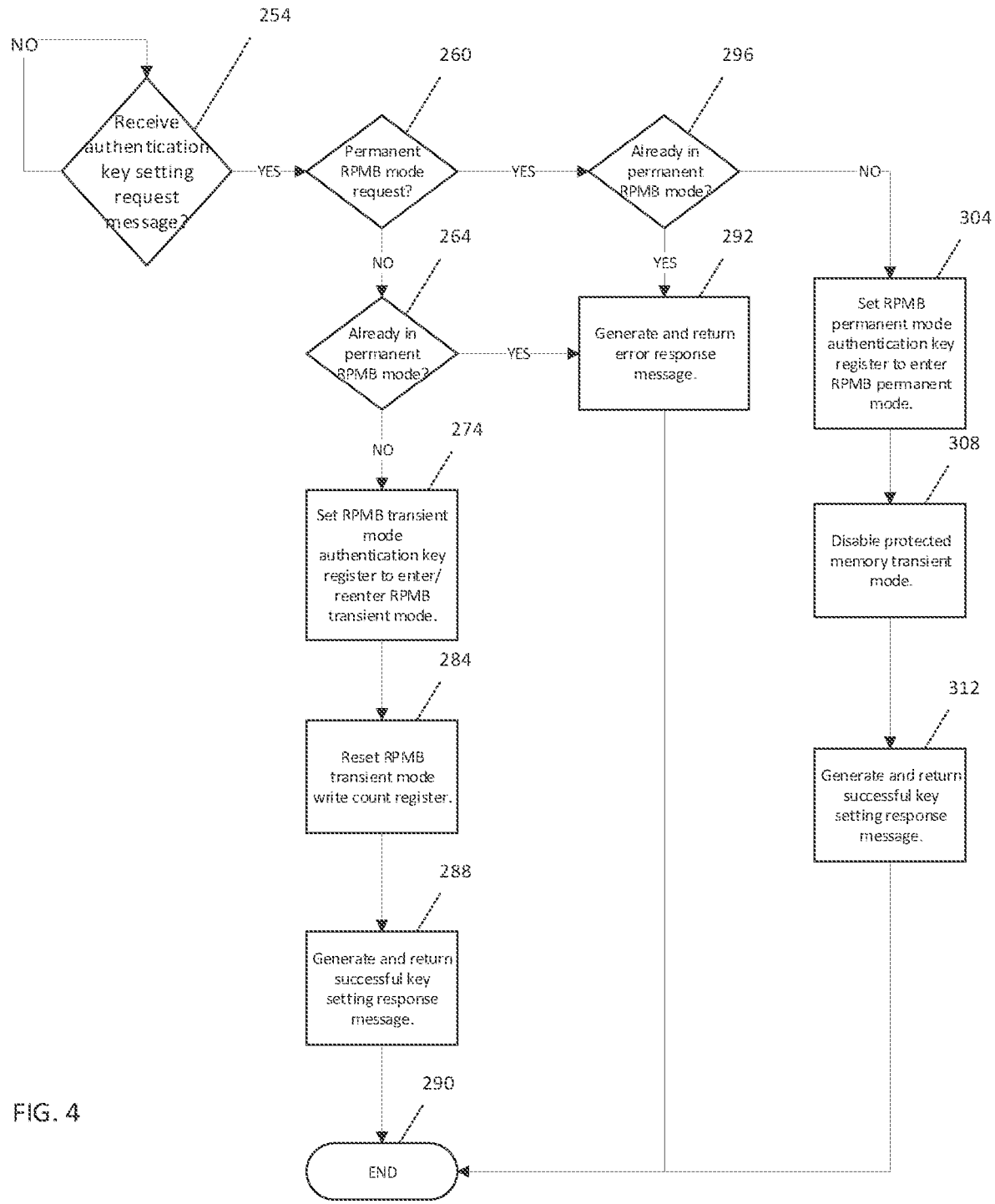
FIG. 4 depicts an example of operations of the protected memory enabled storage device of FIG. 2 employing multi-mode protected memory in accordance with the present description.
Figure 5:
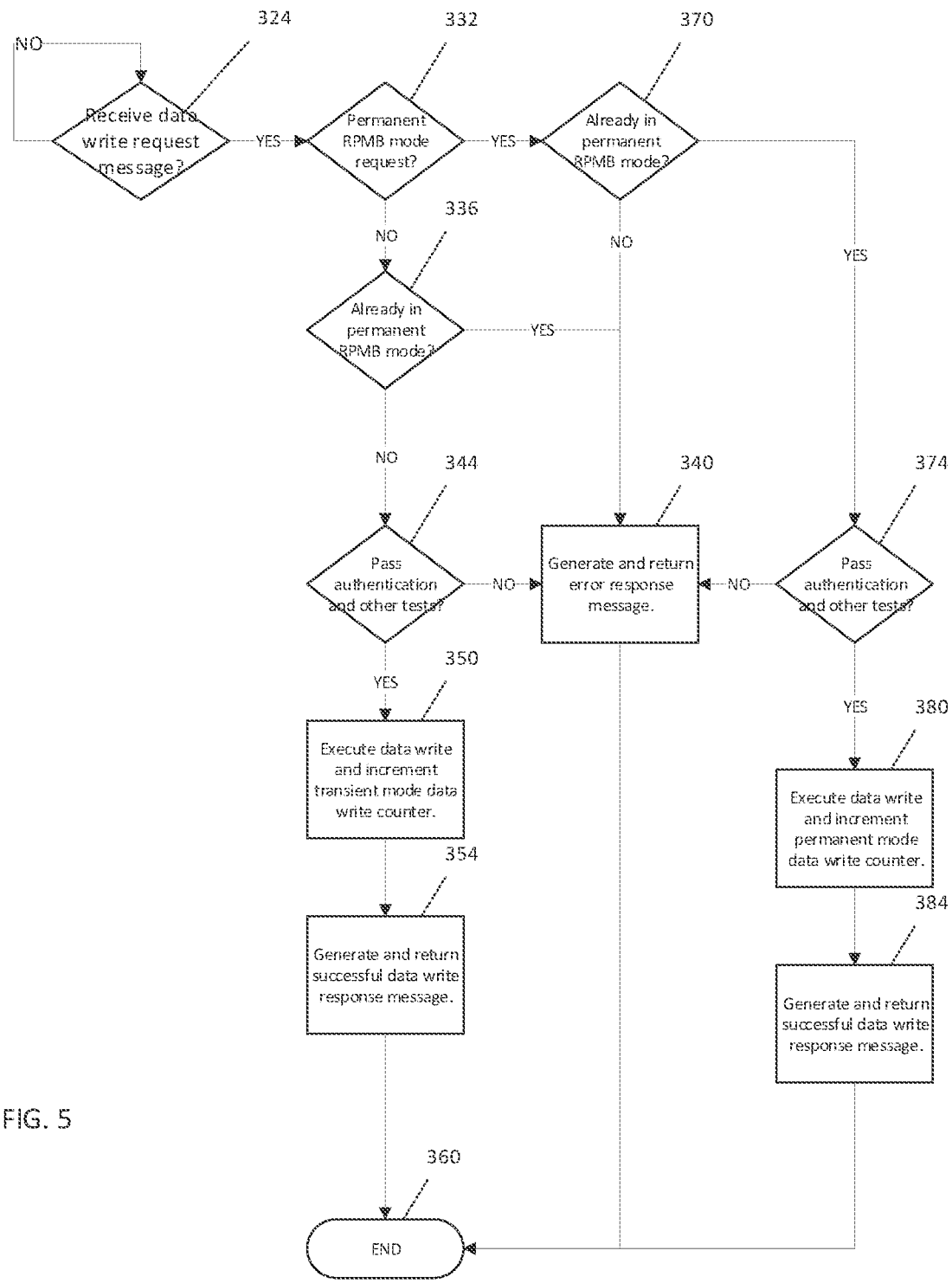
FIG. 5 depicts another example of operations of the protected memory enabled storage device of FIG. 2 employing multi-mode protected memory in accordance with the present description.
Figure 6:
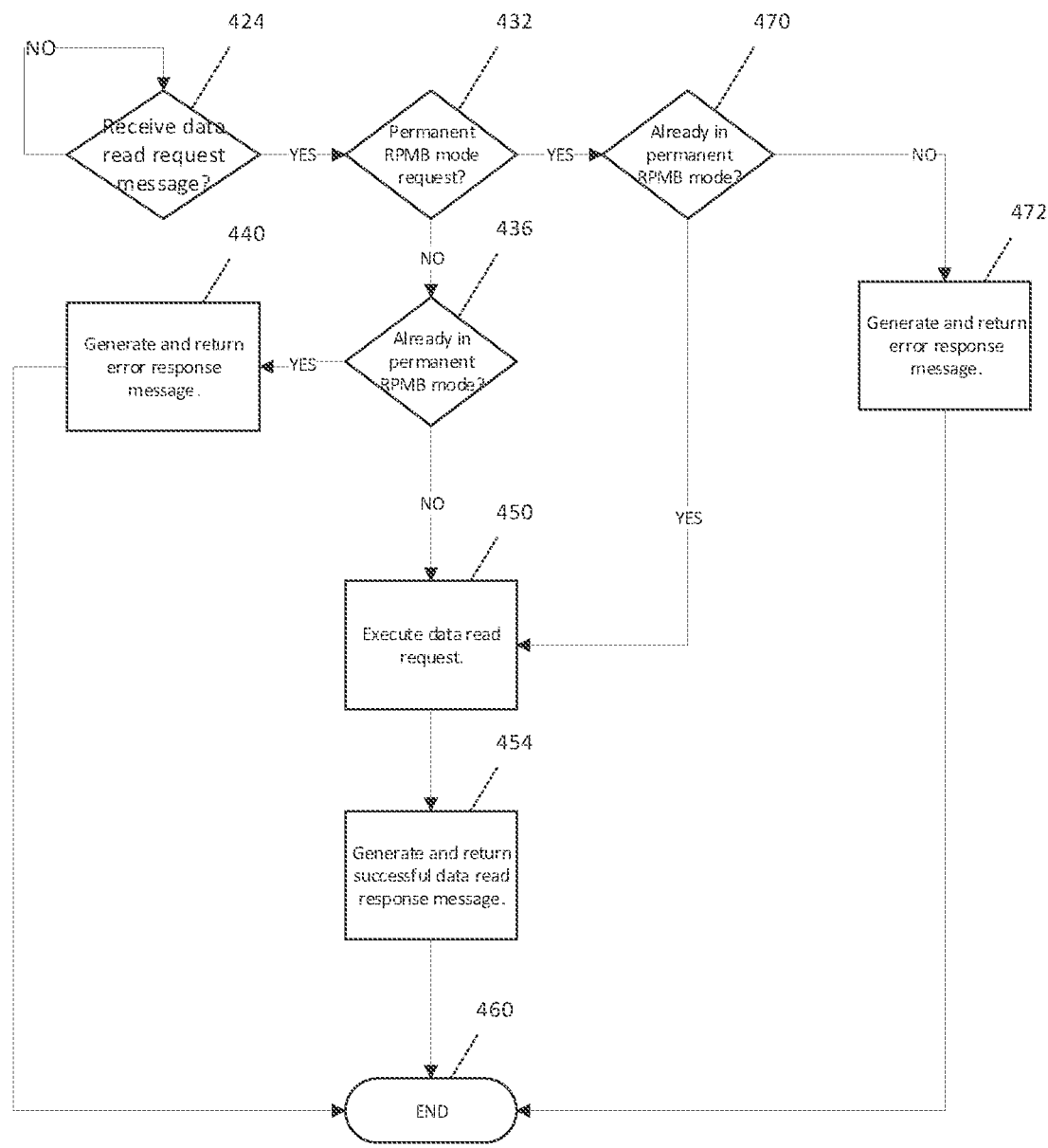
FIG. 6 depicts yet another example of operations of the protected memory enabled storage device of FIG. 2 employing multi-mode protected memory in accordance with the present description.

FIGS. 4, 5 and 6 depict examples of operations which the protected memory controller 134 of a protected memory-enabled storage device 102, is configured to perform. In the example of FIG. 4, the mode of operation of the protected memory controller 134 is selected and initiated by the host 204 (FIG. 3) by requesting the programming of an authentication key in the device 102 using either an authentication key programming request of the transient mode set of protected memory access request messages, or using an authentication key programming request of the permanent mode set of protected memory access request messages. The host 204 can generate or otherwise obtain both a transient mode authentication key and a permanent mode authentication key using suitable logic such as a Message Authentication Code (MAC) engine 234 of the protected memory interface logic 220. An authentication key is obtained in a manner similar to that of known RPMB systems, modified as appropriate for multi-mode protected memory in accordance with the present description. If the authentication key is to be used in connection with the transient mode, a copy of the authentication key is stored in data structure 238 of data structures 242 for the transient mode authentication key. Alternatively, if the authentication key is to be used in connection with the permanent mode, a copy of the authentication key is stored in data structure 246 of data structures 242 for the permanent mode authentication key.

The request message generation logic 224 of the host generates an authentication key programming request message which forwards the generated authentication key to the storage device 102 in a manner similar to that of known RPMB systems, modified as appropriate for multi-mode protected memory in accordance with the present description. In this embodiment, the authentication key programming request message is sent by the protected memory interface logic 220 to the storage device 102. If operation of the protected memory in the transient mode is appropriate, the authentication key programming request message is selected from the transient mode set of protected memory access request messages. Conversely, if operation of the protected memory in the permanent mode is appropriate, the authentication key programming request message is selected from the permanent mode set of protected memory access request messages.

The protected memory controller 134 (FIG. 2) of the storage device 102 is configured to determine (block 254, FIG. 4) whether a received request message is an authentication key programming request message in a manner similar to that of known RPMB systems, modified as appropriate for multi-mode protected memory in accordance with the present description. If the received request message is an authentication key programming request message, the protected memory controller 134 (FIG. 2) is further configured in one aspect of the present description, to determine (block 260, FIG. 4) whether the received authentication key programming request message is of the permanent mode set of protected memory access request messages.

If it is determined that the received authentication key programming request message is not of the permanent mode set of protected memory access request messages, that is, it is determined that the received authentication key programming request message is of the transient mode set of protected memory access request messages, the protected memory controller 134 (FIG. 2) is further configured to determine (block 264, FIG. 4) whether the protected memory controller 134 is already in the permanent mode of protected memory operation. In the illustrated embodiment, the register fields 160 of the protected memory controller 134 includes a transient mode disable register field 270 (FIG. 2) which in one embodiment, is not visible to the host. By default, this register field 270 is initially clear (e.g. bit value "0") after the storage device is manufactured by the storage vendor. A clear state of the transient mode disable register field denotes that the transient mode of the protected memory controller has not been disabled. Thus, the clear state the transient mode disable register field indicates that the protected memory is not in the permanent mode and that the transient mode remains available.

In one embodiment, the transient mode disable register may be implemented with a fuse device such that when the transient mode disable register 270 is set or fused by the protected memory controller 134, the transient mode is permanently disabled. Thus, a set or fused transient mode register indicates that the protected memory controller is in the permanent mode and the transient mode is no longer available.

In this manner, the protected memory controller 134 can determine (block 264, FIG. 4) whether the protected memory controller 134 is already in the permanent mode of protected memory operation by reading the transient mode disable register 270 (FIG. 2). If it is determined that the protected memory controller 134 is not already in the permanent mode, the protected memory controller 134 can enter (block 274, FIG. 4) the transient mode (or re-enter the transient mode if it is already in the transient mode) by programming into the register field 146 (FIG. 2), the transient mode authentication key forwarded by the authentication key programming request message received by the protected memory controller 134. Once the transient mode authentication key has been programmed into the register field 146 for the transient mode authentication key, the device 102 enters the transient mode, and the protected memory user data area partition 114 (FIG. 2) may be accessed through suitable access operations such as authenticated data writes and authenticated data reads of the transient mode set of access request messages generated and sent by the host. As noted above, in one embodiment, the authentication key register field 146 may be programmed an unlimited number of times in the transient mode, to facilitate, for example, development of third-party products incorporating protected memory enabled devices.

As a security feature against malicious attacks, known protected memory controllers such as an RPMB controller have a read-only write counter, the output value of which denotes the total number of successful authenticated data write requests made by the host. For example, the initial value of this register after storage drive manufacturing may be 00000000h, and the output value is incremented by one automatically by the RPMB controller with each successful write access to the protected memory data area. As a result, a malicious attack that may include recording a write data request message and replaying the recorded message is blocked from execution because the recorded message being replayed will not contain the write counter value expected by the RPMB controller, that is, the current write counter value.

In known RPMB controllers, the write counter value is not resettable. After the counter has reached the maximum count value (e.g. FFFFFFFFh), the write counter no longer increments to prevent overflow. In one aspect of multi-mode protection memory in accordance with the present description, the protected memory controller 134 has a write counter register field 280 (FIG. 2) which is resettable in the transient mode. It is appreciated that in the development or validation stage of a third party product incorporating a protected memory enabled device, the write counter may reach its maximum value and overflow in a stress test, for example. Having the capability of resetting the write counter register field 280 in the transient mode, permits the protected memory enabled device 102 to be reused in the transient mode for development or validation of the third party product. As a result, the protected memory enabled device 102 need not be discarded just because the write counter register field 280 has reached its maximum count value in the transient mode.

Accordingly, in connection with the protected memory controller 134 entering (block 274, FIG. 4) or re-entering the transient mode by programming the transient mode authentication key into the register field 146 (FIG. 2), the protected memory controller 134 is also configured to reset (block 284, FIG. 4) the write counter register field 280 in the transient mode. In addition, the response message generation logic 164 (FIG. 2) of the protected memory controller 134 generates (block 288, FIG. 4) and returns to the requesting host, an appropriate response message acknowledging successful programming of the transient mode authentication key as requested by the host, completing (block 290, FIG. 4) programming or re-programming of a transient mode authentication key in the transient mode of operations of the protected memory controller 134. The response message acknowledging successful programming of the transient mode authentication key is generated and sent in a manner similar to known response messages acknowledging successful programming of an authentication key, modified as appropriate for multi-mode protection memory in accordance with the present description.

In one embodiment, the transient mode authentication key may be programmed and re-programmed an unlimited number of times in the transient mode. However, it is appreciated that in some embodiments, it may be appropriate to set a limit on the number of reprogrammings of the transient mode authentication key.

In another aspect of multi-mode protected memory in accordance with the present description, in one embodiment, if the protected memory controller 134 enters the permanent mode, the transient mode may not be entered or re-entered. Thus, entry into the permanent mode is permanent and may not be exited as a security feature. In the example of FIG. 4, if it is determined (block 260, FIG. 2) that the received authentication key programming request message is of the transient mode set of protected memory access request messages, and the protected memory controller 134 (FIG. 2) determines (block 264, FIG. 4) that the protected memory controller 134 is already in the permanent mode of protected memory operation, the response message generation logic 164 (FIG. 2) of the protected memory controller 134 generates (block 292, FIG. 4) and returns to the requesting host, an appropriate response message indicating an error condition as a security measure against malicious attacks and to provide for backward compatibility.

As noted above, in one embodiment, the register field 150 of register fields 160, is a write once register field configured to store the one-time programmable authentication key for the permanent mode. In known RPMB controllers, the authentication key may be programmed once only as well as a security feature. Accordingly, in the example of FIG. 4, if the protected memory controller 134 (FIG. 2) determines (block 260, FIG. 4) that the received authentication key programming request message is of the permanent mode set of protected memory access request messages, and the protected memory controller 134 (FIG. 2) further determines (block 296, FIG. 4) that the protected memory controller 134 is already in the permanent mode of protected memory operation, the response message generation logic 164 (FIG. 2) of the protected memory controller 134 generates (block 292, FIG. 4) and returns to the requesting host, an appropriate response message indicating an error condition because re-programming the permanent mode authentication key is not permitted in the embodiment of FIG. 4 as a security feature and to facilitate backward compatibility. It is appreciated however, that in some embodiments, it may be appropriate to permit reprogramming of permanent mode authentication keys. By comparison, in the transient mode of the embodiment of FIG. 4, programming and reprogramming of a transient mode authentication key as described above in connection with operations, 254-290 may be repeated an unlimited number of times as described above.

Conversely if it is determined (block 260, FIG. 4) that the received authentication key programming request message is of the permanent mode set of protected memory access request messages, and it is determined (block 296, FIG. 4) that the protected memory controller 134 is not already in the permanent mode of protected memory operation, by reading the transient mode disable register 270 (FIG. 2) (transient mode disable register field 270 is clear in this example), the protected memory controller 134 can enter (block 304, FIG. 4) the permanent mode by programming into the register field 150 (FIG. 2), the permanent mode authentication key forwarded by the authentication key programming request message received by the protected memory controller 134. Once the permanent mode authentication key has been programmed into the write-once register field 150 for the permanent mode authentication key, the protected memory user data area partition 114 (FIG. 2) may be accessed through suitable access operations such as authenticated data writes and authenticated data reads of the permanent mode set of access request messages to be generated and sent by the host. As noted above, in one embodiment, the authentication key register field 150 may be programmed only once in the permanent mode since development and validation of third-party products incorporating protected memory enabled devices may have already been completed using the same or similar protected memory enabled device 102 in a previous transient mode.

In the illustrated embodiment, entering the permanent mode is permanent such that the transient mode may not be entered after the permanent mode is entered as a security measure against malicious attacks. Accordingly, in connection with the permanent mode authentication key being programmed into the write-once register field 150 to enter the permanent mode, in the embodiment of FIG. 4, the mode logic 138 (FIG. 2) of the protected memory controller 134 sets or fuses the transient mode disable register field 270 (FIG. 2) to disable (block 308, FIG. 4) the transient mode of operation of the protected memory controller 134. Thus, when the transient mode disable register 270 is set or fused, the transient mode is permanently disabled and the set or fused transient mode register indicates that the protected memory controller is in the permanent mode and the transient mode is no longer available. It is appreciated that in some embodiments, it may be appropriate to permit entry into the transient mode after the permanent mode has been entered.

In addition, the response message generation logic 164 (FIG. 2) of the protected memory controller 134 generates (block 312, FIG. 4) and returns to the requesting host, a response message acknowledging successful programming of the permanent mode authentication key as requested by the host, completing (block 290, FIG. 4) programming of the permanent mode authentication key in the permanent mode of operations of the protected memory controller 134. The response message acknowledging successful programming of the permanent mode authentication key may be generated and sent in a manner similar to that of known RPMB device response messages acknowledging successful programming of an authentication key, modified as appropriate for multi-mode protected memory in accordance with the present description. In one embodiment, the permanent mode authentication key may be programmed once only for the permanent mode as a security feature. However, it is appreciated that in some embodiments, it may be appropriate to allow additional reprogrammings of the permanent mode authentication key.

In one aspect of multi-mode protected memory in accordance with the present description, it is appreciated that, after permanently exiting the transient mode and permanently entering the permanent mode, there may have been some data in the protected memory user data area partition 114 that was generated or written when the device 102 was in the transient mode. In one embodiment, the data left in the partition 114 may be retained so that it remains as the device 102 transitions to the permanent mode. For example, the data left over from the transient mode may be critical or otherwise important data that is securely provisioned in the device 102 in the permanent mode. Thus, the data may not be overwritten without the permanent mode authentication key as described below.

Alternatively, data from the transient mode may be purged from the partition 114 as the device permanently enters the permanent mode. In one embodiment, the data may be purged completely, and the purging be performed automatically by the protected memory controller 134 which triggers an internal "purge command" to erase or secure erase data in the partition 114 after the device permanently exits the transient mode. Such an automatic erasure can provide a security feature against malicious data which might have been stored in the partition 114 during the transient mode. For example, the purge can prevent malicious data left over from the transient mode corrupting security software in the permanent mode. Nevertheless, in one embodiment, it may be appropriate for security software in the permanent mode to initially treat the partition 114 as a blank storage device in the permanent mode as a further security measure.

As previously mentioned, as a security feature against malicious attacks, known protected memory controllers such as an RPMB controller have a read-only write counter, the output value of which denotes the total number of successful authenticated data write requests made by the host, and is not resettable. Here too, the protected memory controller 134 has a write counter register field 320 (FIG. 2) for the permanent mode, in which the write counter is not resettable in the permanent mode. It is appreciated that the development or validation stage of a third party product incorporating a protected memory enabled device, may be completed prior to entering the permanent mode of the protected memory controller 134. Therefore, the concern that the write counter may reach its maximum value and overflow in a stress test, for example, likely will be obviated in the permanent mode.

As noted above, once the transient mode authentication key has been programmed into the register field 146 for the transient mode authentication key, the protected memory user data area partition 114 (FIG. 2) may be accessed in the transient mode through suitable access operations such as authenticated data writes, and authenticated data reads of the transient mode set of access request messages generated and sent by the host. Once the device 102 enters the permanent mode by programming the permanent mode authentication key into the register field 150, the protected memory user data area partition 114 (FIG. 2) may be accessed through suitable access operations such as authenticated data writes and authenticated data reads of the permanent mode set of access request messages generated and sent by the host. FIG. 5 depicts one example of operations of the protected memory controller 134 configured to process an authenticated data write operation in accordance with multi-mode protected memory of the present description.

In this example, an authenticated data write to the protected memory user data area partition 114, is requested using either an authenticated data write request of the transient mode set of protected memory access request messages, or using an authenticated data write request of the permanent mode set of protected memory access request messages, depending upon which mode of operation the protected memory controller 134 is in. The protected memory controller 134 (FIG. 2) of the storage device 102 is configured to determine (block 324, FIG. 5) whether a received request message is an authenticated data write request message. If so, the protected memory controller 134 (FIG. 2) is further configured to determine (block 332, FIG. 5) whether the received authenticated data write request message is of the permanent mode set of protected memory access request messages. As previously described, one set of command codes may be used in connection with the transient mode set of request messages and a different set of command codes may be used in connection with the permanent mode set of request messages, to facilitate distinguishing the transient and permanent mode sets from each other.

If it is determined that the received authenticated data write request message is not of the permanent mode set of protected memory access request messages, that is, it is determined that the received authenticated data write request message is of the transient mode set of protected memory access request messages, the protected memory controller 134 (FIG. 2) is further configured to determine (block 336, FIG. 5) whether the protected memory controller 134 is already in the permanent mode of protected memory operation. As noted above, the register fields 160 of the protected memory controller 134 include a transient mode disable register field 270 (FIG. 2) which either remains clear indicating that the protected memory controller 134 remains in the transient mode, or has been set or fused indicating that the protected memory controller is in the permanent mode. Thus, the protected memory controller 134 can determine (block 336, FIG. 5) whether the protected memory controller 134 is already in the permanent mode of protected memory operation by reading the transient mode disable register 270 (FIG. 2).

If it is determined that the protected memory controller 134 is already in the permanent mode following receipt of a transient mode authenticated data write request message, the protected memory controller 134 deems the received transient mode data write request message to be invalid and execution of the requested write operation is blocked. In addition, the protected memory controller 134 generates (block 340, FIG. 5) and returns an error message to the requesting host. In one embodiment, execution of operations of the transient mode set are not permitted once the protected memory enters the permanent mode, as a security feature against malicious attacks and to provide for backward compatibility. It is appreciated that in some embodiments such a security feature may be omitted.

Conversely, if it is determined that the protected memory controller 134 is not already in the permanent mode, that is, that the protected memory controller 134 is still operating within the transient mode, following receipt of a transient mode authenticated data write request message, the protected memory controller 134 is configured to perform (block 344, FIG. 5) authentication and other security tests in connection with the received transient mode authenticated data write request message before permitting execution of the transient mode requested data write operation directed to the protected memory user data area partition 114 (FIG. 2).

In one embodiment, the authentication and other tests performed in connection with the received transient mode authenticated data write request message may be similar to those performed by known RPMB controllers such as those described in a published RPMB standard, modified as appropriate for multi-mode protected memory operations of the present description. For example, in known RPMB systems, using a Message Authentication Code (MAC) engine of the host, the host calculates a MAC authentication code as a function of a shared authentication key, and a portion of a data write request message. In some known systems, a MAC authentication code may also be calculated by the host as a function of a current write counter value of the RPMB device. In one embodiment of a multi-mode protected memory system in accordance with the present disclosure, a transient mode authentication key has been stored in both the data structure 238 (FIG. 3) of the host, and also stored in the re-programmable register field 146 (FIG. 2) of the protected memory controller 134, such that the transient mode authentication key is a secret shared by the host and the protected memory controller 134 of the device 102. Using the Message Authentication Code (MAC) engine 234 of the host, the host calculates a MAC authentication code as a function of the shared transient mode authentication key, and a portion of the data write request message. In some embodiments, a MAC authentication code may also be calculated by the host as a function of a current write counter value of the device 102 The MAC authentication code calculated by the host is included with the transient mode authenticated data write request message sent to and received (block 324, FIG. 5) by the device 102. Hence, the write operation requested by the data write request message is referred to as an "authenticated data write."

The protected memory controller 134 performs an authentication test in a manner similar to that of known RPMB controllers as described in the RPMB standard, but modified as appropriate for the transient mode of multi-mode protected memory operations of the present description. In this embodiment, the protected memory controller 134 receiving the transient mode authenticated data write request message, authenticates the received message using the shared transient mode authentication key. For example, in a manner similar to that described above in connection with the host, using the Message Authentication Code (MAC) engine 142 of the controller 134, the protected memory controller 134 calculates a MAC authentication code as a function of the shared transient mode authentication key stored in the register field 146 (FIG. 2) and the same portion of the data write request message used by the host to calculate the MAC authentication code included with the write request. In some embodiments, MAC authentication code may also be calculated as a function of a current write counter value of the device 102 The MAC authentication code calculated by the protected memory controller 134 is compared to the MAC authentication code included with the transient mode authenticated data write request message sent to the device 102. If the two MAC authentication codes match, the received message passes the authentication process of the protected memory controller 134 and the received data write request message is deemed authentic, that is, sent by an authorized sender.

However, in some embodiments, a data write operation requested by the data write request message may be subjected to additional security tests such as address range tests and write counter test or other tests in a manner similar to that of known RPMB controllers such as those described in the RPMB standard, but modified as appropriate for the transient mode of multi-mode protected memory operations of the present description.

For example, an address range test may be performed by the protected memory controller 134 in a manner similar to that of known RPMB controllers, modified as appropriate for the transient mode of multi-mode protected memory operations of the present description. In the illustrated embodiment, the address range test determines whether the target address of the data write operation is within an expected range.

As previously mentioned, another security feature of known RPMB devices is a write counter maintained by the RPMB controller of the RPMB storage device. In one embodiment, upon successful execution (block 350, FIG. 5) of a transient mode data write operation to the protected memory user data area partition 114 requested by a transient mode data write message which has been authenticated as valid (block 344, FIG. 5) and the other security tests passed, the register field 280 (FIG. 2) for the transient mode write counter is incremented (block 350, FIG. 4).

When generating a transient mode data write request message, the MAC engine 234 (FIG. 3) of the requesting host may include the current incremented write count value of the device 102, together with a calculated MAC authentication code in the data write request message as described above. In a write counter test embodiment, if the receiving protected memory controller 134 determines that the write count value included with the data write request message does not match the current count value of the register field 280 of the protected memory controller's write counter, the received data write request message is deemed invalid and execution of the requested write operation is blocked. In addition, the protected memory controller 134 generates (block 340, FIG. 5) and returns an error message to the requesting host.

If the data write request message is authenticated and the other security tests are passed, the requested data write operation is executed (block 350, FIG. 5), writing requested data to the protected memory user data area partition 114 (FIG. 2) of the device 102. In addition, the register field 280 (FIG. 2) for the transient mode write counter is incremented, and the response message generation logic 164 (FIG. 2) of the protected memory controller 134 generates (block 354, FIG. 5) and returns to the requesting host, a response message acknowledging successful data write requested by the transient mode authenticated data write request message. In one embodiment, the protected memory controller 134 returns a zero error code response to indicate a successful write in a manner similar to that of known RPMB controllers as described in the RPMB standard. In response to the successful write acknowledgment, the host protected memory interface logic 220 increments the write count value stored in a data structure 356 to indicate the current transient mode write counter value which will be transmitted to the device 102 with the next authenticated write message as described above.

In known RPMB systems, there is a write-counter read request command which the host can issue in a request message to read the initial write counter value of the RPMB controller at each boot before doing any write access to the RPMB storage device. The host can cache this initial write counter value in memory, and as long as the host detects that an authenticated write is successful as described above, the host software can increment the cached write counter value to keep the write counter value synchronized between the host and the RPMB controller.

In multi-mode protected memory in accordance with the present description, the host 204 issues a write-counter read request message in a manner similar to known RPMB hosts to initialize the write counter value in cache to the current write counter value of the device 102. In response to each successful write acknowledgment (block 354, FIG. 5), the host protected memory interface logic 220 increments the write count value stored in a data structure 356 to indicate the current transient mode write counter value which will be transmitted to the device 102 with the next authenticated write message as described above. Alternatively and in one embodiment, it is appreciated that the incremented write count value of the register field 280 (FIG. 2) of the device 102 may be reported back to the requesting host in the response message (block 354, FIG. 5). Upon transmission (block 354, FIG. 5) of the response message, the authenticated data write to the protected memory user data area partition 114 completes (block 360, FIG. 5) in the transient mode.

Authenticated data writes as described herein may be performed an unlimited number of times in the transient mode. Should the incremented write count value of the register field 280 (FIG. 2) reach the maximum value in the transient mode, the incremented write count value of the register field 280 (FIG. 2) may be readily reset by programming the same or another authentication key in the register field 160 for the transient mode as described above in connection with FIG. 4.

By comparison, in the permanent mode, once the incremented write count value of the register field 320 (FIG. 2) reaches the maximum value in the permanent mode, the incremented write count value of the register field 320 (FIG. 2) may not be reset, preventing further authenticated data writes in the permanent mode as described below.

If it is determined (block 332, FIG. 5) that the received authenticated data write request message is of the permanent mode set of protected memory access request messages, the protected memory controller 134 (FIG. 2) is further configured to determine (block 370, FIG. 5) whether the protected memory controller 134 is in the permanent mode of protected memory operation. As noted above, the transient mode disable register field 270 (FIG. 2) may be set or fused to disable entry into the transient mode, and thus indicate that the protected memory controller is in the permanent mode. In this manner, the protected memory controller 134 can determine (block 370, FIG. 5) whether the protected memory controller 134 is already in the permanent mode of protected memory operation by reading the transient mode disable register 270 (FIG. 2).

If following receipt of a permanent mode authenticated data write request message, it is determined that the protected memory controller 134 is in the transient mode, the protected memory controller 134 deems the received permanent mode data write request message to be invalid and execution of the requested write operation is blocked. In addition, the protected memory controller 134 generates (block 340, FIG. 5) and returns an error message to the requesting host. In one embodiment, execution of data write, and data read operations of the permanent mode set are not permitted if the protected memory is in the transient permanent mode, as a security feature against malicious attacks and to provide for backward compatibility. It is appreciated that in some embodiments such a security feature may be omitted.

Conversely, if it is determined following receipt of a permanent mode authenticated data write request message, that the protected memory controller 134 is in the permanent mode, the protected memory controller 134 is configured to perform (block 374, FIG. 5) authentication and other security tests in connection with the received permanent mode authenticated data write request message before permitting execution of the permanent mode requested data write operation directed to the protected memory user data area partition 114 (FIG. 2).

In one embodiment, the authentication and other tests performed in connection with the received permanent mode authenticated data write request message may be similar to those performed by known RPMB controllers, modified as appropriate for multi-mode protected memory operations of the present description. In one embodiment, as described above in connection with FIG. 4, a permanent mode authentication key has been stored in this example in both the data structure 246 (FIG. 3) of the host, and also stored in the write once register field 150 (FIG. 2) of the protected memory controller 134, such that the permanent mode authentication key is a secret shared by the host and the protected memory controller 134 of the device 102. Using the Message Authentication Code (MAC) engine 234 of the host, the host calculates a MAC authentication code as a function of the shared permanent mode authentication key and a portion of the data write request message. In some embodiments, the MAC authentication code may also be calculated by the host as a function of a current write counter value of the device 102 The calculated MAC authentication code is included with the permanent mode authenticated data write request message received (block 324, FIG. 5) by the device 102. Hence, the write operation requested by the data write request message is referred to as an "authenticated data write."

The protected memory controller 134 performs an authentication test in a manner similar to that of known RPMB controllers as described in the RPMB standard, but modified as appropriate for the permanent mode of multi-mode protected memory operations of the present description. In this embodiment, the protected memory controller 134 receiving the permanent mode authenticated data write request message, authenticates the received message using the shared permanent mode authentication key. For example, in a manner similar to that described above in connection with the host, using the Message Authentication Code (MAC) engine 142 of the controller 134, the protected memory controller 134 calculates a MAC authentication code as a function of the shared permanent mode authentication key stored in the register field 146 (FIG. 2) and the same portion of the data write request message used by the host to calculate the MAC authentication code included with the write request. In some embodiments, the MAC authentication code may also be calculated as a function of a current write counter value of the device 102 The MAC authentication code calculated by the protected memory controller 134 is compared to the MAC authentication codes included with the permanent mode authenticated data write request message sent to the device 102. If the two MAC authentication codes match, the received message passes the authentication process of the protected memory controller 134 and the received data write request message is deemed authentic, that is, sent by an authorized sender.

However, in this embodiment, a data write operation requested by the data write request message may be subjected to additional security tests in the permanent mode such as address range tests and write counter and other tests in a manner similar to that of known RPMB controllers as described in the RPMB standard, but modified as appropriate for the permanent mode of multi-mode protected memory operations of the present description.

An address range test may be performed by the protected memory controller 134 in a manner similar to that of known RPMB controllers, modified as appropriate for the permanent mode of multi-mode protected memory operations of the present description. In the illustrated embodiment, the address range test determines whether the target address of the data write operation is within an expected range.

As previously mentioned, another security feature of known RPMB devices is a write counter maintained by the RPMB controller of the RPMB storage device. In this embodiment, upon successful execution (block 380, FIG. 5) of a permanent mode data write operation to the protected memory user data area partition 114 requested by a permanent mode data write message which has been authenticated as valid (block 374, FIG. 5) and the other security tests passed, the register field 320 (FIG. 2) for the permanent mode write counter is incremented (block 380, FIG. 5). The requesting host in response to an authenticated response message as described below, synchronizes the write count value in a data structure 390 for the permanent mode write counter value to the current write counter value of the protected memory controller 134 in a manner similar to that described above in connection with the transient mode. The MAC authentication code calculated by the host may in some embodiments, be calculated as a function of the write count value synchronized by the host with the current write counter value of the protected memory controller 134, and stored in the host's data structure 390 for the permanent mode write counter value.

When generating the next permanent mode data write request message, the MAC engine 234 (FIG. 3) of the requesting host includes in some embodiments, the last reported incremented write count value stored in the data structure 390 (FIG. 2), together with a calculated MAC authentication code in the data write request message as described above. In a write counter test embodiment, if the receiving protected memory controller 134 determines that the write count value included with the data write request message does not match the permanent mode current count value of the register field 320 of the protected memory controller's permanent mode write counter, the received data write request message is deemed invalid and execution of the requested write operation is blocked. In addition, the protected memory controller 134 generates (block 340, FIG. 5) and returns an error message to the requesting host.

If the data write request message is authenticated and the other security tests are passed, the requested data write operation is executed (block 380, FIG. 5), writing requested data to the protected memory user data area partition 114 (FIG. 2) of the device 102. In addition, the register field 320 (FIG. 2) for the permanent mode write counter is incremented, and the response message generation logic 164 (FIG. 2) of the protected memory controller 134 generates (block 384, FIG. 5) and returns to the requesting host, a response message acknowledging successful data write requested by the permanent mode authenticated data write request message. The host synchronizes the write count value stored in the data structure 390 with the incremented write count value of the register field 320 (FIG. 2) of the device 102 as described above. The authenticated data write to the protected memory user data area partition 114 accordingly completes (block 360, FIG. 5) in the permanent mode.

Authenticated data writes as described herein may be performed a limited number of times in the permanent mode. Should the incremented write count value of the register field 320 (FIG. 2) reach the maximum value in the permanent mode, the incremented write count value of the register field 320 (FIG. 2) may not be reset, preventing further authenticated data writes in the permanent mode as a security feature.

In contrast, the incremented write count value of the register field 280 (FIG. 2) for the transient mode may be readily reset by programming the same or another authentication key in the register field 160 for the transient mode as described above in connection with FIG. 4. Accordingly, an unlimited number of authenticated data writes is permitted as long as the device 102 stays in the transient mode. However, once the device enters the permanent mode, the device may not re-enter the transient mode as a security precaution, in one embodiment.

As noted above, once the transient mode authentication key has been programmed into the register field 146 for the transient mode authentication key, or the permanent mode authentication key has been programmed into the register field 150 for the permanent mode authentication key as described above in connection with FIG. 4, the protected memory user data area partition 114 (FIG. 2) may be accessed through suitable access operations such as authenticated data writes as described above in connection with FIG. 5 and authenticated data reads of the transient or permanent mode sets of access request messages generated and sent by the host. However, in some embodiments, the protected memory user data area partition 114 (FIG. 2) may also be accessed in read operations which do not have authenticated read results.

FIG. 6 depicts one example of operations of the protected memory controller 134 configured to process an authenticated data read operation in accordance with multi-mode protected memory of the present description. In this example, an authenticated data read to the protected memory user data area partition 114, is requested using either an authenticated data read request of the transient mode set of protected memory access request messages, or using an authenticated data read request of the permanent mode set of protected memory access request messages, depending upon which mode of operation the protected memory controller 134 is in. The protected memory controller 134 (FIG. 2) of the storage device 102 is configured to determine (block 424, FIG. 6) whether a received request message is an authenticated data read request message. If so, the protected memory controller 134 (FIG. 2) is further configured to determine (block 432, FIG. 6) whether the received authenticated data read request message is of the permanent mode set of protected memory access request messages. As previously described, one set of command codes may be used in connection with the transient mode set of request messages and a different set of command codes may be used in connection with the permanent mode set of request messages, to facilitate distinguishing the transient and permanent mode sets from each other.

If it is determined that the received authenticated data read request message is not of the permanent mode set of protected memory access request messages, that is, it is determined that the received authenticated data read request message is of the transient mode set of protected memory access request messages, the protected memory controller 134 (FIG. 2) is further configured to determine (block 436, FIG. 6) whether the protected memory controller 134 is already in the permanent mode of protected memory operation. As noted above, the register fields 160 of the protected memory controller 134 includes a transient mode disable register field 270 (FIG. 2) which either remains clear indicating that the protected memory controller 134 remains in the transient mode, or has been set or fused indicating that the protected memory controller is in the permanent mode. Thus, the protected memory controller 134 can determine (block 436, FIG. 6) whether the protected memory controller 134 is already in the permanent mode of protected memory operation by reading the transient mode disable register 270 (FIG. 2).

If it is determined that the protected memory controller 134 is already in the permanent mode following receipt of a transient mode authenticated data read request message, the protected memory controller 134 deems the received transient mode data read request message to be invalid and execution of the requested read operation is blocked. In addition, the protected memory controller 134 generates (block 440, FIG. 6) and returns an error message to the requesting host. In one embodiment, execution of operations of the transient mode set are not permitted once the protected memory enters the permanent mode, as a security feature against malicious attacks and to provide for backward compatibility. It is appreciated that in some embodiments such a security feature may be omitted.

Conversely, if it is determined that the protected memory controller 134 is not already in the permanent mode, that is, that the protected memory controller 134 is still operating within the transient mode, following receipt of a transient mode authenticated data read request message, the protected memory controller 134 is configured to execute (block 450, FIG. 6), the requested data read operation by, reading the requested data from the protected memory user data area partition 114 (FIG. 2) of the device 102. In addition, the protected memory controller 134 generates (block 454, FIG. 6) and returns an authenticated read response message which includes the requested read data. Hence, the read operation requested by the data read request message is referred to as an "authenticated data read."

In one embodiment, the transient mode authenticated data read response message may be the same or similar to those generated by known RPMB controllers, modified as appropriate for multi-mode protected memory operations of the present description. As noted above, in this embodiment, a transient mode authentication key has been stored in this example, in both the data structure 238 (FIG. 3) of the host, and also stored in the re-programmable register field 146 (FIG. 2) of the protected memory controller 134, such that the transient mode authentication key is a secret shared by the host and the protected memory controller 134 of the device 102. Using the Message Authentication Code (MAC) engine 142 of the device 102, the protected memory controller 134 calculates a MAC authentication code as a function of the shared transient mode authentication key and a portion of the data read response message.

The MAC authentication code calculated by the protected memory controller 134 is included with the transient mode authenticated data read response message returned (block 454, FIG. 6) by the device 102. In one embodiment, the MAC authentication code calculated by the protected memory controller 134 may also be calculated as a function of a random number supplied by the host with the data read request message transmitted to the device 102 by the host. In the embodiment of FIG. 3, the host protected memory interface logic 220 includes a random number generator (RNG) 456. The generated random number is sent to the device 102 with the transient mode authenticated data read request message received (block 424, FIG. 6) by the device 102. In one embodiment, the transient mode authenticated data read response message following a successful read operation to the protected memory user data area partition 114 (FIG. 2) may include as an additional security measure, a copy of the random number initially sent to the device 102 by the host with the data read request message. Upon transmission of the authenticated data read response message, the role of protected memory controller 134 in the authenticated read operation completes (block 460).

Upon receipt of the authenticated data read response message from the device 102, the host performs an authentication process in a manner similar to that of known RPMB enabled hosts as described in the RPMB standard, but modified as appropriate for the transient mode of multi-mode protected memory operations of the present description. In this embodiment, the host receiving the transient mode authenticated data read response message, authenticates the data read response message using the shared transient mode authentication key. For example, in a manner similar to that described above in connection with the protected memory controller 134, using the Message Authentication Code (MAC) engine 234, the host protected memory interface logic 220 calculates a MAC authentication code as a function of the shared transient mode authentication key stored in the data structure 238 (FIG. 3) and the same portion of the data read response message used by the protected memory controller 134 (FIG. 3) to calculate the MAC authentication code included with the read response. The MAC authentication code calculated by the host 204 is compared to the MAC authentication code included with the transient mode authenticated data read response message sent to the host 204. If the two MAC authentication codes match, the received read response message passes the authentication process of the host 204 and the received data read response message is deemed authentic, that is, sent by an authorized sender.

However, in this embodiment, a data read operation requested by the data read request message may be subjected to additional security tests such a random number test, in a manner similar to that of known RPMB enabled hosts and controllers as described in the RPMB standard, but modified as appropriate for the transient mode of multi-mode protected memory operations of the present description. For example, the host 204 may compare the random number included with the transient mode authenticated data read response message sent to the host 204 to the random number generated by the host 204 and included in the transient mode authenticated data read request message sent to the device 102. If the two random numbers match, the received read response message passes the authentication process of the host 204 and the received data read response message forwarding the read data is deemed authentic, that is, sent by an authorized sender.

In one embodiment, authenticated data reads as described herein may be performed an unlimited number of times in either the transient mode or the permanent mode once the transient mode is permanently exited. However, it is appreciated that in some embodiments, a limit may be imposed on the number of authenticated read operations in the transient mode, the permanent mode, or both, depending upon the particular application.

If it is determined (block 432, FIG. 6) that the received authenticated data read request message is of the permanent mode set of protected memory access request messages, the protected memory controller 134 (FIG. 2) is further configured to determine (block 470, FIG. 6) whether the protected memory controller 134 is in the permanent mode of protected memory operation. As noted above, the transient mode disable register field 270 (FIG. 2) may be set or fused to disable entry into the transient mode, and thus indicate that the protected memory controller is in the permanent mode. In this manner, the protected memory controller 134 can determine (block 470, FIG. 6) whether the protected memory controller 134 is already in the permanent mode of protected memory operation by reading the transient mode disable register 270 (FIG. 2).

If following receipt of a permanent mode authenticated data read request message, it is determined that the protected memory controller 134 is in the transient mode, the protected memory controller 134 deems the received permanent mode data read request message to be invalid and execution of the requested read operation is blocked. In addition, the protected memory controller 134 generates (block 472, FIG. 6) and returns an error message to the requesting host. In one embodiment, execution of authenticated read operations of the permanent mode set are not permitted if the protected memory is in the transient permanent mode, as a security feature against malicious attacks and to provide for backward compatibility. It is appreciated that in some embodiments such a security feature may be omitted.

Conversely, if it is determined following receipt of a permanent mode authenticated data read request message, that the protected memory controller 134 is in the permanent mode, the protected memory controller 134 is configured to execute (block 450, FIG. 6), the requested data read operation, by reading the requested data from the protected memory user data area partition 114 (FIG. 2) of the device 102. In addition, the protected memory controller 134 generates (block 454, FIG. 6) and returns an authenticated read response message which includes the requested read data, in a manner similar to that described in connection with an authenticated read response in the transient mode.

Upon receipt of the authenticated data read response message from the device 102, the host performs an authentication process in a manner similar to that described above in connection with the transient mode authenticated data read response message, but modified as appropriate for the permanent mode of multi-mode protected memory operations of the present description. In this embodiment, the host receiving the permanent mode authenticated data read request message, authenticates the data read response message using the shared permanent mode authentication key. For example, in a manner similar to that described above in connection with the protected memory controller 134, using the Message Authentication Code (MAC) engine 234, the host protected memory interface logic 220 calculates a MAC authentication code as a function of the shared permanent mode authentication key stored in the data structure 238 (FIG. 3) and the same portion of the data read response message used by the protected memory controller 134 (FIG. 3) to calculate the MAC authentication code included with the read response. The MAC authentication code calculated by the host 204 is compared to the MAC authentication codes included with the permanent mode authenticated data read response message sent to the host 204. If the two MAC authentication codes match, the received read response message passes the authentication process of the host 204 and the received data read response message is deemed authentic, that is, sent by an authorized sender. In some embodiments, the host and the device 102 may calculated their respective MAC authentication codes also as a function of the random number generated by the host and sent to the device 102 in the authenticated data read request message as described above.

However, in this embodiment, a data read response requested by the data read request message may be subjected to additional security tests such a random number test, in a manner similar to that of known RPMB controllers as described in the RPMB standard, but modified as appropriate for the permanent mode of multi-mode protected memory operations of the present description. For example, the host 204 may compare the random number included with the permanent mode authenticated data read response message sent to the host 204 to the random number generated by the host 204 and included in the permanent mode authenticated data read request message sent to the device 102. If the two random numbers match, the received read response message passes the authentication process of the host 204 and the received data read response message forwarding the read data is deemed authentic, that is, sent by an authorized sender.

Other request message types of the RPMB standard may be handled in a selected transient mode or in a permanent mode by an RPMB enabled storage device having multi-mode protected memory in accordance with the present description, in a similar manner to that described above. Thus, other request messages for example, may be handled in a manner similar to that of known RPMB controllers, modified as appropriate for multi-mode protected memory operations of the present description.

For example, another known request message type of the RPMB standard is a read counter value request message generated by an RPMB host and sent to an RPMB enabled storage device which returns the current write counter value in a response message. Like a data read request message, a read counter value request message includes a random number generated by the host. The read counter value response message from the RPMB enabled device includes in addition to the write counter value, a MAC authentication code calculated by the RPMB enabled device together with a copy of the random number received with the request message. The host authenticates the read counter value response message in a manner similar to that of an authentication data read response message.

In one embodiment of the present description, the host protected memory interface logic 220 (FIG. 3) of the host 204 generates and sends a read counter value request message to the storage device 102 in a manner similar to that of known RPMB systems, modified as appropriate for multi-mode protected memory in accordance with the present description. For example, a read counter value request message may be modified for the transient mode in a manner similar to the modification of a data read request message for the transient mode as described above in connection with FIG. 6. Similarly, a read counter value request message may be modified for the permanent mode in a manner similar to the modification of a data read request message for the permanent as described above in connection with FIG. 6.

The protected memory controller 134 (FIG. 2) of the device 102 generates and sends a read counter value response message to the host 204 in a manner similar to that of known RPMB systems, modified as appropriate for multi-mode protected memory in accordance with the present description. For example, a read counter value response message may be modified for the transient mode in a manner similar to the modification of a data read response message for the transient mode as described above in connection with FIG. 6. Similarly, a read counter value response message may be modified for the permanent mode in a manner similar to the modification of a data read response message for the permanent mode as described above in connection with FIG. 6.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Drives (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

Examples

The following examples pertain to further embodiments.

Example 1 is an apparatus, comprising: a protected memory; and a protected memory controller configured to control access to the protected memory, the protected memory controller including mode logic configured to control access to the protected memory in a selected mode including a transient mode and a permanent mode, wherein the protected memory controller is further configured to authenticate memory operations directed to the protected memory as a function of a re-programmable authentication key in the transient mode and as a function of a one-time programmable authentication key in the permanent mode.

In Example 2, the subject matter of Examples 1-7 (excluding the present Example) can optionally include wherein the protected memory controller has a register which is configured to be settable to indicate that the protected memory controller supports the transient mode.

In Example 3, the subject matter of Examples 1-7 (excluding the present Example) can optionally include wherein the mode logic has a fuse and is configured to set the fuse to disable entering the transient mode upon entering the permanent mode.

In Example 4, the subject matter of Examples 1-7 (excluding the present Example) can optionally include wherein the protected memory controller has a re-programmable register configured to store the re-programmable authentication key in the transient mode, and a write-once register configured to store the one-time programmable authentication key in the permanent mode.

In Example 5, the subject matter of Examples 1-7 (excluding the present Example) can optionally include wherein the protected memory controller has a resettable write counter configured to count write operations to the protected memory in the transient mode, and a non-resettable write counter configured to count write operations to the protected memory in the permanent mode.

In Example 6, the subject matter of Examples 1-7 (excluding the present Example) can optionally include wherein the protected memory controller is configured to respond to a transient mode set of request messages in the transient mode, and a permanent mode set of request messages in the permanent mode wherein an error response message is returned in response to receipt of a request message of the transient mode set of request messages when the protected memory controller is in the permanent mode.

In Example 7, the subject matter of Examples 1-7 (excluding the present Example) can optionally include a system, said system comprising: said protected memory and protected memory controller, and at least one of the following coupled to the protected memory controller and protected memory, a display configured to display information as a function of memory operations directed to the protected memory, a network interface configured to transmit information as a function of memory operations directed to the protected memory, and a battery configured provide power to the system.

Example 8 is a method, comprising: controlling access to a protected memory in a selected mode including a transient mode in which memory operations directed to the protected memory are authenticated as a function of a re-programmable authentication key, and a permanent mode in memory operations directed to the protected memory are authenticated as a function of a one-time programmable authentication key.

In Example 9, the subject matter of Examples 8-13 (excluding the present Example) can optionally include setting a register to indicate that the protected memory controller supports the transient mode.

In Example 10, the subject matter of Examples 8-13 (excluding the present Example) can optionally include setting a fuse to disable entering the transient mode upon entering the permanent mode.

In Example 11, the subject matter of Examples 8-13 (excluding the present Example) can optionally include storing the re-programmable authentication key in a re-programmable register in the transient mode, and storing the one-time programmable authentication key in a write-once register in the permanent mode.

In Example 12, the subject matter of Examples 8-13 (excluding the present Example) can optionally include resetting a resettable write counter configured to count write operations to the protected memory in the transient mode, and counting write operations to the protected memory in the permanent mode in a non-resettable write counter.

In Example 13, the subject matter of Examples 8-13 (excluding the present Example) can optionally include the protected memory controller responding to a transient mode set of request messages in the transient mode, responding to a permanent mode set of request messages in the permanent mode, and returning an error response message in response to receipt of a request message of the transient mode set of request messages when the protected memory controller is in the permanent mode.

Example 14 is an apparatus comprising means to perform a method as claimed in any preceding example.

Example 15 is an apparatus comprising: a protected memory; and a protected memory controller means configured for controlling access to the protected memory, the protected memory controller means including mode logic means configured for controlling access to the protected memory in a selected mode including a transient mode and a permanent mode, wherein the protected memory controller means is further configured for authenticating memory operations directed to the protected memory as a function of a re-programmable authentication key in the transient mode and as a function of a one-time programmable authentication key in the permanent mode.

Example 16 is a computer program product for a computing system having a protected memory and a protected memory controller, wherein the computer program product comprises a computer readable storage medium having program instructions embodied therewith, the program instructions executable by a processor of the computing system to cause operations, the operations comprising: controlling access to a protected memory in a selected mode including a transient mode in which memory operations directed to the protected memory are authenticated as a function of a re-programmable authentication key, and a permanent mode in memory operations directed to the protected memory are authenticated as a function of a one-time programmable authentication key.

All optional features of any of the systems and/or apparatus described above may also be implemented with respect to the method or process described above, and specifics in the examples may be used anywhere in one or more embodiments. Additionally, all optional features of the method or process described above may also be implemented with respect to any of the system and/or apparatus described above, and specifics in the examples may be used anywhere in one or more embodiments.

What is claimed is:

1. An apparatus, comprising:
   a protected memory; and
   a protected memory controller to include circuitry configured to:
   control access to the protected memory in a selected mode to include a transient mode and a permanent mode;
   authenticate memory operations directed to the protected memory based on a re-programmable authentication key in the transient mode or based on a one-time programmable authentication key in the permanent mode;
   maintain a resettable write counter value to indicate a count of write operations to the protected memory in the transient mode; and
   maintain a non-resettable write counter value to indicate a count of write operations to the protected memory in the permanent mode.

2. The apparatus of claim 1 wherein the protected memory controller has further includes a register configured to be settable to indicate that the protected memory controller supports the transient mode.

3. The apparatus of claim 1 the protected memory controller further includes a fuse, wherein the circuitry is configured to set the fuse to disable entering the transient mode upon entering the permanent mode.

4. The apparatus of claim 1 wherein the protected memory controller further includes a re-programmable register configured to store the re-programmable authentication key in the transient mode, and a write-once register configured to store the one-time programmable authentication key in the permanent mode.

5. The apparatus of claim 1 wherein the protected memory controller is configured to respond to a transient mode set of request messages in the transient mode, and a permanent mode set of request messages in the permanent mode wherein an error response message is returned in response to receipt of a request message of the transient mode set of request messages when the protected memory controller is in the permanent mode.

6. A method, comprising:
controlling access to a protected memory in a selected mode including a transient mode in which memory operations directed to the protected memory are authenticated based on a re-programmable authentication key, or a permanent mode in memory operations directed to the protected memory are authenticated based on a one-time programmable authentication key;
resetting a resettable write counter value to indicate a count of write operations to the protected memory in the transient mode; and
counting, via a non-resettable write value, write operations to the protected memory in the permanent mode.

7. The method of claim 6 further comprising setting a register to indicate that the protected memory controller supports the transient mode.

8. The method of claim 6 further comprising setting a fuse to disable entering the transient mode upon entering the permanent mode.

9. The method of claim 6 further comprising storing the re-programmable authentication key in a re-programmable register in the transient mode, and storing the one-time programmable authentication key in a write-once register in the permanent mode.

10. The method of claim 6 further comprising responding to a transient mode set of request messages in the transient mode, responding to a permanent mode set of request messages in the permanent mode, and returning an error response message in response to receipt of a request message of the transient mode set of request messages when the protected memory controller is in the permanent mode.

11. A system, comprising:
a protected memory configured to store data;
a protected memory controller to include circuitry configured to:
control access to the protected memory in a selected mode to include a transient mode and a permanent mode;
authenticate memory operations directed to the protected memory based on a re-programmable authentication key in the transient mode or based on a one-time programmable authentication key in the permanent mode;
maintain a resettable write counter value to indicate a count of write operations to the protected memory in the transient mode; and
maintain a non-resettable write counter value to indicate a count of write operations to the protected memory in the permanent mode; and
a display configured to display information as a function of memory operations directed to the protected memory.

12. The system of claim 11 wherein the protected memory controller further includes a register configured to be settable to indicate that the protected memory controller supports the transient mode.

13. The system of claim 11 the protected memory controller further includes a fuse, wherein the circuitry is configured to set the fuse to disable entering the transient mode upon entering the permanent mode.

14. The system of claim 11 wherein the protected memory controller further includes a re-programmable register configured to store the re-programmable authentication key in the transient mode, and a write-once register configured to store the one-time programmable authentication key in the permanent mode.

15. The system of claim 11 wherein the protected memory controller is configured to respond to a transient mode set of request messages in the transient mode, and a permanent mode set of request messages in the permanent mode wherein an error response message is returned in response to receipt of a request message of the transient mode set of request messages when the protected memory controller is in the permanent mode.

* * * * *